United States Patent
Hopkins et al.

(10) Patent No.: US 6,706,246 B2
(45) Date of Patent: Mar. 16, 2004

(54) SYSTEM AND METHOD FOR THE SELECTIVE CATALYTIC REDUCTION OF NITROGEN OXIDE IN A GAS STREAM

(75) Inventors: Steven M. Hopkins, Jersey City, NJ (US); Mohamed B. Tolba, Upper Saddle River, NJ (US); Vinod K. Arora, Katy, TX (US); John Paul Fell, Jr., Wall Township, NJ (US)

(73) Assignee: ABB Lummus Global Inc., Bloomfield, NJ (US)

( * ) Notice: Subject to any disclaimer, the term of this patent is extended or adjusted under 35 U.S.C. 154(b) by 115 days.

(21) Appl. No.: 09/793,470

(22) Filed: Feb. 26, 2001

(65) Prior Publication Data

US 2002/0150525 A1 Oct. 17, 2002

(51) Int. Cl.$^7$ .............................................. B01D 53/56
(52) U.S. Cl. .................... 423/239.1; 110/345; 422/172; 422/177; 422/199; 422/200; 422/211; 585/648
(58) Field of Search .......................... 110/345; 422/172, 422/177, 199, 200, 211; 423/239.1; 585/648

(56) References Cited

U.S. PATENT DOCUMENTS

| | | | |
|---|---|---|---|
| 3,887,683 A | 6/1975 | Abe et al. .................... 423/235 |
| 4,160,009 A | 7/1979 | Hamabe ...................... 422/108 |
| 4,160,805 A | * 7/1979 | Inaba et al. .................. 422/180 |
| 4,199,554 A | 4/1980 | Araki et al. .................. 423/239 |
| 4,246,234 A | 1/1981 | Kittrell et al. ............... 422/171 |
| 4,283,368 A | 8/1981 | Harada et al. ............... 422/181 |
| 4,302,431 A | 11/1981 | Atsukawa et al. ........... 423/239 |
| 4,602,673 A | 7/1986 | Michelfelder et al. ......... 165/7 |
| 4,678,643 A | * 7/1987 | Fetzer ......................... 422/175 |
| 4,725,416 A | 2/1988 | Kristof et al. ............... 423/239 |
| 4,726,935 A | 2/1988 | Inatsune et al. ............. 422/171 |
| 4,732,743 A | 3/1988 | Schmidt et al. ............. 423/239 |
| 4,739,826 A | 4/1988 | Michelfelder et al. ....... 165/133 |

(List continued on next page.)

FOREIGN PATENT DOCUMENTS

| | | |
|---|---|---|
| DE | 3637 861 A1 | 5/1988 |
| EP | 0 286 892 A1 | 10/1988 |
| EP | 0 365 899 A2 | 5/1990 |
| EP | 0 365 899 A3 | 5/1990 |
| EP | 0 555 719 A1 | 8/1993 |
| JP | 354004870 A * | 1/1979 |
| WO | WO 98/03249 | 1/1998 |
| WO | WO 00/53904 | 9/2000 |

*Primary Examiner*—Stanley S. Silverman
*Assistant Examiner*—Maribel Medina
(74) *Attorney, Agent, or Firm*—Dilworth & Barrese, LLP.

(57) ABSTRACT

A system and method for the selective catalytic reduction of nitrogen oxide in a furnace exhaust includes cooling the furnace exhaust in a first heat recovery section to a temperature between 400° F. and 500° F., introducing a reducing agent into the exhaust gas and reacting the nitrogen oxide in the exhaust gas with the reducing agent in the presence of an SCR catalyst in a reactor positioned in the furnace stack. The treated gas emerging from the reactor can be further cooled in a second heat recovery section. The system and process is particularly suitable for use in conjunction with furnaces for thermally cracking hydrocarbon feedstock to produce olefin. The feedstock is preferably preheated in the heat recovery sections prior to introduction into the furnace.

22 Claims, 2 Drawing Sheets

U.S. PATENT DOCUMENTS

| | | | |
|---|---|---|---|
| 4,820,492 A | 4/1989 | Wada et al. ................. | 422/111 |
| 4,828,806 A | 5/1989 | Flockenhaus et al. .... | 423/213.5 |
| 4,867,953 A | 9/1989 | Riekert et al. .............. | 423/239 |
| 4,880,378 A | 11/1989 | Hums ......................... | 431/170 |
| 4,903,755 A | 2/1990 | Michelfelder et al. ......... | 165/7 |
| 4,916,107 A | 4/1990 | Brand et al. ................ | 502/309 |
| 4,950,473 A | 8/1990 | Flockenhaus et al. ........ | 423/235 |
| 4,961,917 A | 10/1990 | Byrne ........................ | 423/239 |
| 5,047,220 A | 9/1991 | Polcer ........................ | 423/239 |
| 5,078,973 A | 1/1992 | Kuroda et al. .............. | 422/171 |
| 5,104,629 A | 4/1992 | Dreschler ................... | 423/239 |
| 5,108,717 A | 4/1992 | Deller et al. ................ | 422/171 |
| 5,139,757 A | 8/1992 | Topsoe ....................... | 423/239 |
| 5,145,652 A | 9/1992 | Veser et al. ................. | 422/171 |
| 5,149,884 A | 9/1992 | Brenner et al. ............. | 568/471 |
| 5,155,083 A | 10/1992 | Yoshida et al. ............. | 502/242 |
| 5,275,230 A | 1/1994 | Balling et al. ................. | 165/7 |
| 5,296,206 A | 3/1994 | Cho et al. ................... | 423/235 |
| 5,318,755 A | 6/1994 | Kuivalainen et al. ........ | 422/171 |
| 5,380,499 A | 1/1995 | MacInnis ................... | 422/173 |
| 5,401,479 A | 3/1995 | Matros et al. ............ | 423/239.1 |
| 5,437,851 A | 8/1995 | MacInnis .................. | 423/239.1 |
| 5,474,751 A | 12/1995 | Sigling et al. ............ | 423/239.1 |
| 5,603,909 A | 2/1997 | Varner et al. ............. | 423/239.1 |
| 5,678,625 A | 10/1997 | Schlüter et al. .................. | 165/7 |
| 5,694,869 A | 12/1997 | Breen et al. ................ | 110/345 |
| 5,728,356 A | 3/1998 | Iida et al. ................. | 423/239.1 |
| 5,738,024 A * | 4/1998 | Winegar ..................... | 110/345 |
| 5,756,059 A | 5/1998 | Zamansky et al. ........ | 423/239.1 |
| 5,814,284 A | 9/1998 | Schlüter ..................... | 422/175 |
| 5,817,282 A | 10/1998 | Radlein et al. .............. | 423/235 |
| 5,820,838 A | 10/1998 | Tsuo et al. .................. | 423/235 |
| 5,918,555 A | 7/1999 | Winegar ..................... | 110/345 |
| 5,985,222 A | 11/1999 | Sudduth et al. ............. | 423/235 |
| 5,988,115 A | 11/1999 | Anderson et al. ........... | 122/4 D |
| 6,019,068 A | 2/2000 | Tsuo et al. ................... | 122/4 D |
| 6,048,510 A | 4/2000 | Zauderer .................... | 423/235 |
| 6,066,303 A | 5/2000 | Sudduth et al. ............. | 423/235 |
| 6,080,376 A | 6/2000 | Iida et al. ................. | 423/239.1 |
| 6,117,405 A * | 9/2000 | Frey et al. ................... | 423/235 |

* cited by examiner

SYSTEM AND METHOD FOR THE SELECTIVE CATALYTIC REDUCTION OF NITROGEN OXIDE IN A GAS STREAM

BACKGROUND OF THE INVENTION

1. Field of the Invention

The invention herein relates to a system and method for catalytically reducing the content of nitrogen oxide in a flue or stack gas, resulting from the combustion of fuel in a furnace

2. Description of the Related Art

The combustion of fuels in various industrial processes often generates undesirable oxides of nitrogen ($NO_x$), usually in the form of nitric oxide (NO) and nitrogen dioxide ($NO_2$). High combustion temperatures tend to produce more $NO_x$. Because $NO_x$ is harmful to the environment, efforts have been made to reduce the emission of $NO_x$ in gases produced by industrial processes involving the combustion of fuel, particularly gases resulting from the operation of power plants, thermal cracking furnaces, incinerators, internal combustion engines, metallurgical plants, fertilizer plants and chemical plants.

Methods for selectively reducing the $NO_x$, content of a flue gas are known. Generally, such methods involve the reaction of $NO_x$ with a reducing agent, optionally in the presence of a catalyst. The selective non-catalytic reduction ("SNCR") of $NO_x$ with a reducing agent such as ammonia or urea requires a relatively high temperature, e.g., in the range of from about 1600° F. to about 2100° F.

Alternatively, the reduction of $NO_x$ with ammonia can be performed catalytically at a much lower temperature, e.g. from about 500° F. to about 950° F., in a process known as selective catalytic reduction ("SCR").

One problem associated with the treatment of flue gas using conventional SCR methods and apparatus is that the weight and bulk of the equipment necessary to achieve satisfactory removal of $NO_x$ requires that it be located at ground level. Many industrial plants need to be retrofitted with $NO_x$ removal ("deNOx") equipment in order to meet the requirements of more stringent government regulations. However, because of the physical bulk of the deNOx system, the flue gas must be diverted to ground level for treatment and then sent back into a stack for subsequent exhaust to the atmosphere. To avoid the large cost of such a system it would be highly advantageous to provide a relatively lightweight deNOx unit which can be incorporated directly into the stack.

SUMMARY OF THE INVENTION

In accordance with the present invention, a system is provided for the selective catalytic reduction of nitrogen oxide in a furnace gas stream and comprises:

a) a first heat recovery section positioned in a stack above the furnace for reducing the temperature of the furnace gas stream exiting the furnace to not less than about 400° F.;

b) a reactor for the selective catalytic reduction of nitrogen oxide in the gas stream positioned in the stack downstream of the first heat recovery section, said reactor including an injector for introducing a reducing agent into the gas stream and containing at least one nitrogen oxide conversion catalyst for the selective catalytic reduction of nitrogen oxide in the gas stream upon contact therewith to provide a treated gas stream of reduced nitrogen oxide concentration;

c) a treated gas stream outlet through which the treated gas stream is discharged; and, d) a second heat recovery section positioned downstream of the reactor for reducing the temperature of treated gas.

BRIEF DESCRIPTION OF THE DRAWINGS

Various embodiments of the reactor component of the system of this invention and various catalyst arrangements employable therein are described below with reference to the drawings wherein.

DETAILED DESCRIPTION OF PREFERRED EMBODIMENTS

As used herein the terms "stack" and "flue" are used synonymously. All quantities should be understood as being modified by the term "about" or "approximately". Composition percentages are by weight unless specified otherwise.

The term "nitrogen oxide" as used herein refers to any oxide of nitrogen, such as NO, $NO_2$, $N_2O_4$, $N_2O$, and is alternatively designated as "$NO_x$".

The system and method for the selective catalytic reduction of $NO_x$ preferably employ ammonia as the reducing agent. $NO_x$ reacts with ammonia in the presence of a catalyst to produce nitrogen and water as shown in the following equation (not stoichiometrically balanced):

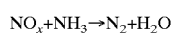

$$NO_x + NH_3 \rightarrow N_2 + H_2O$$

The reactor and deNOx method described herein can be used in any application requiring the treatment of a $NO_x$—containing flue gas to reduce its $NO_x$ level. Typical combustion equipment producing high levels of $NO_x$ include power plants, fluid catalytic cracking (FCC) regenerators, glass furnaces, thermal crackers, and the like. The deNOx method herein will be particularly described in conjunction with a thermal cracking unit for producing olefins (e.g., ethylene, propylene, butylene, etc.) from a saturated hydrocarbon feedstock such as ethane, propane, naphtha and the like. However, the reactor and method can be used with any combustion equipment or process which generates a flue gas containing undesirable levels of $NO_x$.

Figure 1B:
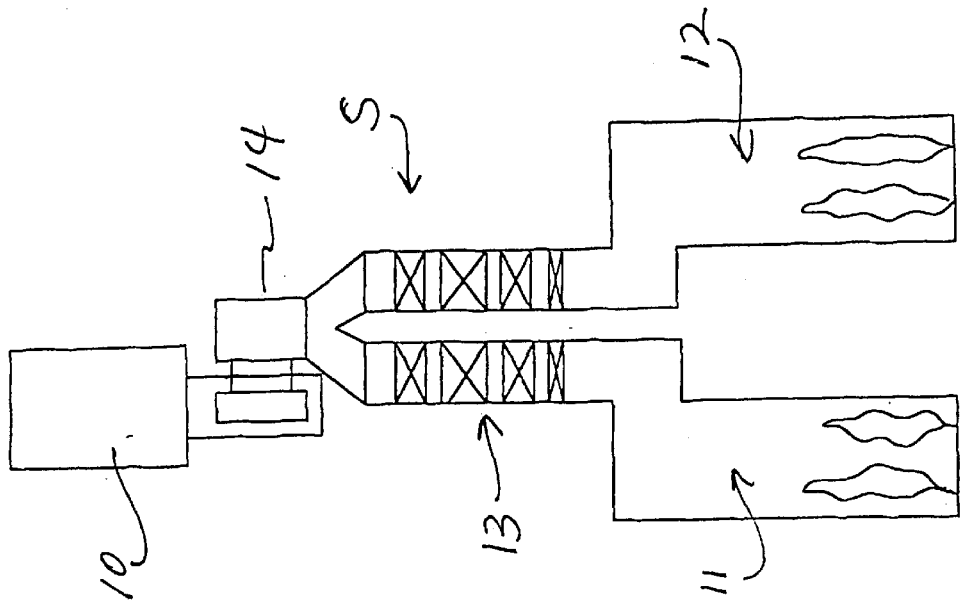
FIG. 1B is a side view of the furnace system of FIG. 1A.
Figure 1A:
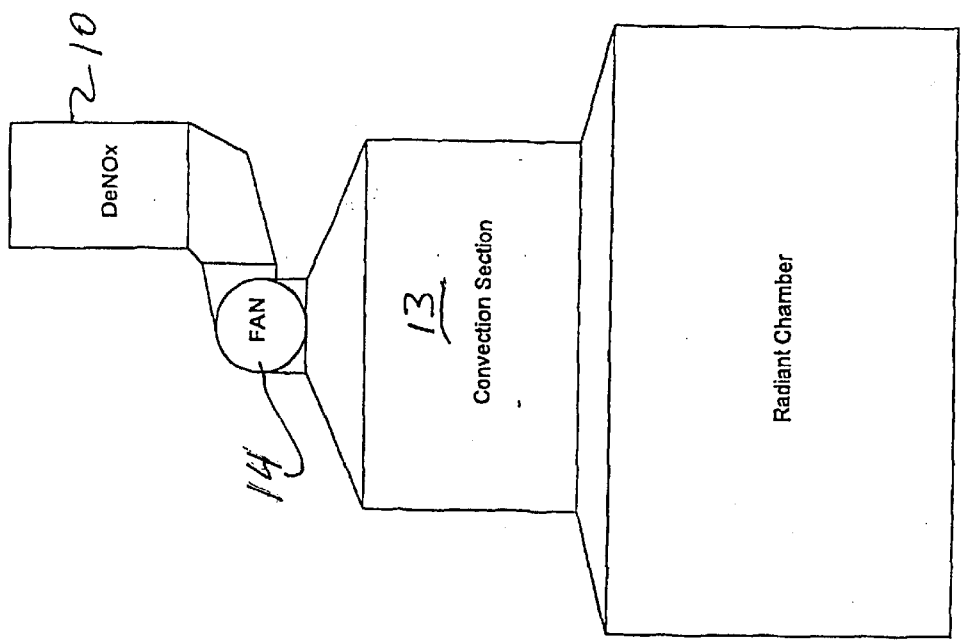
FIG. 1A is a diagrammatic view of a furnace system of a known type incorporating the reactor in its stack section.

Referring now to FIGS. 1A and 1B, gas phase deNOx reactor system 10 is illustrated in conjunction with a thermal cracking system employing twin furnaces 11 and 12 having a radiant combustion chamber operating at about 2200° F. for the cracking of the feedstock. Each furnace produces a flue gas which exits therefrom through respective stacks S. Typically, the flow rate of flue gas in each stack ranges from about 100,000–300,000 lbs/hr. The flue gas typically contains the following components:

| | |
|---|---|
| Nitrogen | 60–80 vol % |
| Oxygen | 1–4 vol % |
| Water vapor | 10–25 vol % |
| Carbon dioxide | 2–20 vol % |
| Nitrogen oxide | 50–300 ppm. |

The flue gases exiting the furnace are typically at a temperature of about 1800° F. Each stack includes a convection section 13 which includes heat exchange equipment through which the flue gas is passed for heat recovery in which heat is transferred from the flue gas to the furnace feedstock. The flue gas typically exits the convection section of conventional stack systems at a temperature of from about 250° F.–350° F. However, the heat recovery process of the present invention is adjusted to provide flue gas temperatures of not less than about 400° F., preferably from about 400° F. to 500° F. as explained below. The flue gases of the separate stacks are then united and moved by fan 14 into deNOx system 10. Fan 14 increases the pressure of the flue gas for moving the gas through the deNOx system 10.

A significant feature of the present invention is that the deNOx reactor system 10 is mounted within the stack and is positioned above convection section 13 and fan 14. This advantage is achieved by reducing the size and weight of the deNOx reactor system, thereby enabling existing furnace systems to be modified by retrofitting and avoiding the more costly alternative of diverting stack gas to ground level for deNOx treatment.

Figure 2:
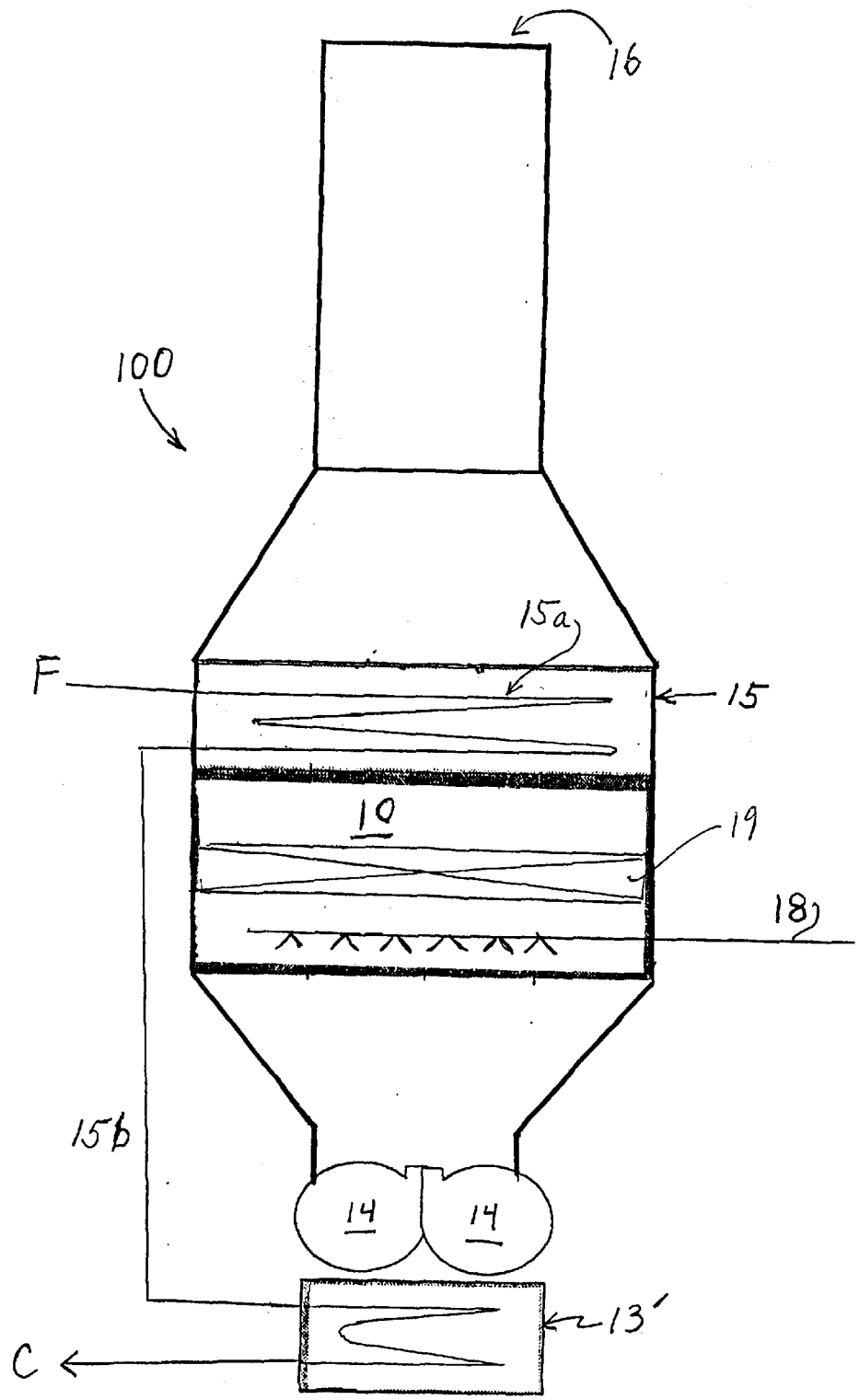
FIG. 2 is a diagrammatic view of a stack system for SCR conversion of $NO_x$.

Referring now to FIG. 2, system 100 for SCR conversion of $NO_x$ is intended for use in conjunction with a furnace system such as the thermal cracking system illustrated in FIGS. 1A and 1B. However, in accordance with the method of the present invention, the convection section 13 represents a primary, or first, heat recovery section and is configured to cool the exhaust gas from the radiant section to a temperature of not less than about 400° F., preferably from about 400° F. to about 500° F. This range can be achieved by the appropriate configuration of cooling coils in the convection section or any other suitable method of adjusting heat transfer as recognized by those skilled in the art. The flue gas at 400° F.–500° F. is driven by one or more fans 14 into reactor 10. The reactor includes an injection device 18 for introducing a reducing agent such as ammonia, urea, alkyl amine, etc., into the flue gas, and a catalyst bed 19 containing a catalyst for the selective reduction of $NO_x$ present in the flue gas. The catalyst bed can have, for example, a radial flow or parallel flow configuration, and can include a particulate catalyst, monolith catalyst, or a microengineered catalyst ("MEC") supported on a mesh-like support having at least 85% void space.

The mesh-like support material of the MEC catalyst includes fibers or wires, metal felt, metal gauge, metal fiber filter or the like and can include one or more layers. The catalyst can be coated onto the mesh by a variety of techniques such as dipping, spraying, etc., in an amount sufficient to achieve the desired conversion of $NO_x$. A MEC catalyst suitable for use in the present invention is described in copending U.S. Patent application Serial No. 60/222,261 filed Jul. 31, 2000 entitled "Conversion of Nitrogen Oxides in the Presence of a Catalyst Supported on a Mesh-Like Structure", the contents of which are incorporated by reference herein in their entirety.

Reactor systems suitable for use in the present invention include those disclosed in U.S. patent application Ser. Nos. 09/793,471, 09/793,448 and 09/793,447, the disclosures of which are incorporated by reference herein in their entirety.

The temperature of the treated gas exiting reactor 10 is about the same as that of the inlet gas and generally ranges from about 400° F. to 500° F. The higher the temperature of the SCR conversion reaction, the less catalyst is needed. Hence, significant reduction of the size and weight of the reactor system to achieve a desired conversion of $NO_x$ can be achieved by operating the reactor at temperatures of from about 400° F. to about 500° F. rather than at lower temperatures. Indeed, the reduction of reactor size permits the reactor to be positioned within the exhaust stack and above convection section 13 and fan 14. It is desirable to achieve at least about an 85% reduction of the $NO_x$ content of the flue gas, preferably at least about 90% reduction of the $NO_x$ content, and more preferably at least about 95% reduction of the $NO_x$ content.

In accordance with the system and method of the present invention, a second heat recovery section 15 downstream of the catalytic reactor system 10 is preferably employed to reduce the temperature of the treated gas, preferably to a range of from about 250° F. to 3500° F.

Heat recovered from the treated gas exiting reactor 10 can be used as desired and in the thermal cracking system illustrated in FIGS. 1A and 1B, is advantageously used for preheating the feedstock as shown in FIG. 2. Thermal cracking feedstock F is introduced into second heat recovery section 15 for preheating. Heat recovery section 15 includes one or more heat transfer tubes 15a. Feedstock F flows through tubes 15a to recover heat from the treated gas exiting the reactor 10. Thereafter, feedstock F passes from heat recovery section 15 and is conveyed via piping tie-in 15b to the first heat recovery section, i.e., convection section 13, for further preheating. Feedstock exits convection section 13' via line C for transfer to the thermal cracking furnace. Construction and configuration of the heat recovery section 15 to achieve the desired reduction in temperature is within the skill of those with knowledge in the art. The treated exhaust gas exits system 100 at outlet 16 at temperatures typically in the range of from about 250° to about 350° F.

The system herein is advantageous for retrofitting existing furnace systems with a stack reactor. By moving a small portion of an existing convection system downstream of a reactor inserted into the stack, the reactor size requirements can be reduced to increase the feasibility of such a system. The downstream portion of the convection section functions as heat recovery section 15.

The Example below illustrates the deNOx system and method of the present invention.

EXAMPLE

The system of the present invention illustrated in FIG. 2 is employed wherein a flue gas flow rate of 360,000 lbs/hr having an initial $NO_x$ concentration of 100 ppm is passed through convection section 13' such that the gas exiting the convection section 13' has a temperature of about 420° F. This flue gas is blown by fans 14 into and through deNOx reactor 10 mounted in the stack. Ammonia is introduced into the flue gas and provides for the selective catalytic reduction of $NO_x$ when the ammonia-containing gas passes through a catalyst bed containing an SCR catalyst such as $V_2O_5/TiO_2$ catalyst, e.g., on a mesh-like support having at least 85% void space. About 12 $m^3$ of catalyst is required at the operating temperature of 420° F. The treated flue gas exiting the reactor is at about the same temperature at which it entered the reactor and has a $NO_x$ content of 10 ppm. The treated gas then enters heat recovery section 15 whereupon the temperature of the gas stream is reduced to 250° F. to 350° F. by heat transfer, e.g., to furnace feedstock, and is thereafter discharged from the stack via outlet 16. The treated gas at discharge from the stack will typically have a $NO_x$ content which has been reduced by about 90% or more relative to the concentration of $NO_x$ in the flue gas prior to treatment.

In contrast to the Example given above, in a typical conventional system, wherein the convection section reduces the temperature of the flue gas to appreciably less than about 400° F, e.g., to about 350° F., the reactor requires a relatively large catalyst bed volume, i.e., about 54 m$^3$. The reactor size reduction achieved by the system of the invention illustrated in the Example above makes retrofitting a stack reactor to a conventional stack system a feasible alternative to otherwise costly modifications.

While the above description contains many specifics, these specifics should not be construed as limitations on the scope of the invention, but merely as exemplifications of preferred embodiments thereof. Those skilled in the art will envision many other possibilities within the scope and spirit of the invention as defined by the claims appended hereto.

What is claimed is:

1. A system for the selective catalytic reduction of nitrogen oxide in a furnace flue gas stream having an initial concentration of nitrogen oxide, which comprises:
   a) a combustion zone, a convection section positioned above the combustion zone, and a stack positioned above the convection section,
   b) a first heat recovery section positioned in the convection section for reducing the temperature of the furnace flue gas stream exiting the combustion zone to not less than about 400° F.,
   c) a fan positioned downstream of the first heat recovery section for moving flue gas from the convection section to the stack,
   d) a reactor for the selective catalytic reduction of nitrogen oxide in the flue gas stream positioned in the stack downstream of the fan, said reactor including an injector for introducing a reducing agent into the flue gas stream and containing at least one nitrogen oxide conversion catalyst for the selective catalytic reduction of nitrogen oxide in the flue gas stream upon contact therewith to provide a treated gas stream of reduced nitrogen oxide concentration;
   e) a treated gas stream outlet through which treated gas is discharged; and,
   f) a second heat recovery section positioned in the stack downstream of the reactor for reducing the temperature of the treated gas and connected to the first heat recovery section by a piping tie-in for permitting the flow of a fluid therebetween.

2. The system of claim 1 wherein the catalyst is a particulate.

3. The system of claim 1 wherein the catalyst is a monolith.

4. The system of claim 1 wherein the catalyst is supported on a mesh-like structure.

5. The system of claim 4 wherein the mesh-like structure comprises one or more layers of fibers, wires, metal fiber filter or metal felt.

6. The system of claim 1 wherein the reduced concentration of nitrogen oxide is at least about an 85% reduction relative to the initial concentration.

7. The system of claim 1 wherein the reduced concentration of nitrogen oxide is at least about a 90% reduction relative to the initial concentration.

8. The system of claim 1 wherein the reactor is a radial flow reactor.

9. The system of claim 1 wherein the reactor is a parallel flow reactor.

10. The system of claim 1 further comprising:
    d) a furnace which produces a flue gas stream containing nitrogen oxide.

11. The system of claim 10 wherein the furnace is a hydrocarbon cracking furnace for producing olefin from a saturated hydrocarbon feedstock introduced into the furnace.

12. The system of claim 1 wherein the fan is positioned between the convection section and the stack second section.

13. A method for the selective conversion of nitrogen oxide in a furnace flue gas stream having an initial concentration of nitrogen oxide comprising:
    a) providing a furnace system having a combustion zone, a convection section above the combustion zone, a stack positioned above the convection section, and a fan for moving furnace flue gas downstream from the convection section to the stack, the furnace system having a first heat recovery section positioned in the convection section, a reactor positioned in the stack downstream of the fan, and a second heat recovery section positioned in the stack downstream of the reactor, the second heat recovery section being operatively connected to the first heat recovery section for transferring heat recovery fluid thereto;
    b) cooling the furnace flue gas stream to a temperature of not less than about 400° F. in the first heat recovery section in the convection section of the furnace system;
    c) moving the flue gas stream into the stack;
    d) introducing a reducing agent into the gas stream;
    e) reacting the reducing agent with the nitrogen oxide in the gas stream in the reactor at a temperature of from not less than about 400° F. in the presence of at least one nitrogen oxide conversion catalyst for the selective catalytic reduction of nitrogen oxide to produce a treated gas having a reduced concentration of nitrogen oxide;
    f) cooling the treated gas in the second heat recovery section by transferring heat to a heat recovery fluid; and,
    g) communicating the heat recovery fluid from the second heat recovery section in the stack to the first heat recovery section in the convection section of the furnace system.

14. The method of claim 13 wherein the reduced concentration of nitrogen oxide is at least about an 85% reduction of nitrogen oxide relative to the initial concentration.

15. The method of claim 13 wherein the reduced concentration of nitrogen oxide is at least about a 90% reduction of nitrogen oxide relative to the initial concentration.

16. The method of claim 13 further including the step of thermally cracking a hydrocarbon feedstock introduced into the furnace to produce at least one olefin from the hydrocarbon feedstock, wherein step (d) of cooling the treated gas reduces the temperature of the treated gas to not more than about 350° F. and comprises transferring heat from the treated gas to the feedstock prior to introducing the feedstock into the furnace.

17. The method of step 16 wherein step (a) of cooling the furnace flue gas stream comprises transferring heat from the furnace flue gas to the feedstock prior to introducing the feedstock to the furnace.

18. The method of claim 13 wherein the reducing agent is ammonia.

19. The method of claim 13 wherein the step (a) of cooling the furnace flue gas stream is performed in a first heat recovery section and the step (d) of cooling the treated gas is performed in a second heat recovery section, and the method further includes the step of communicating a heat recovery fluid from the second heat recovery section to the first heat recovery section.

20. A system for the selective catalytic reduction of nitrogen oxide in a gas stream having an initial concentration of nitrogen oxide, which comprises:
 a) a first combustion zone and a first convection section positioned above the first combustion zone, a first primary heat recovery section being positioned in the first convection section for reducing the temperature of a flue gas stream exiting the first combustion zone to not less than 400° F.;
 b) a second combustion zone and a second convection section positioned above the second combustion zone, a second primary heat recovery section being positioned in the second convection section for reducing the temperature of a flue gas stream exiting the second combustion zone to not less than 400° F.;
 c) a stack positioned above the first and second convection sections;
 d) a transition section for conveying flue gas from the first and second convection sections to the stack;
 e) at least one fan positioned above the first and second convection sections for moving flue gas streams from the first and second convection sections into a single stream flowing through the stack,
 f) a reactor for the selective catalytic reduction of nitrogen oxide positioned in the stack downstream of the fan, said reactor including an injector for introducing a reducing agent into the flue gas stream and containing at least one nitrogen oxide conversion catalyst operable at a temperature of not less than 400° F. for the selective reduction of nitrogen oxide in the flue gas stream upon contact therewith to provide a treated gas stream of reduced nitrogen oxide concentration; and,
 g) a secondary heat recovery system positioned in the stack downstream of the reactor and connected to the first and/or second primary heat recovery sections by a piping tie-in for permitting the flow of a heat transfer fluid therebetween.

21. A method for modifying an existing combustion system, wherein the combustion system includes a combustion zone, a convection section above the combustion zone, a first heat recovery system positioned in the convection section, a stack positioned above the convection section, and a fan positioned between the convection section and the stack, the method comprising:
 a) providing a substitute stack section which includes a reactor and a second heat recovery system, the reactor containing a catalyst for the selective catalytic reduction of nitrogen oxide with a reducing agent, said catalyst being adapted to operate at not less than 400° F., said second heat recovery system being positioned above the reactor;
 b) retrofitting the substitute stack section to the existing combustion system such that the substitute stack section is positioned above the convection section and downstream of the fan;
 c) connecting the second heat recovery system to the first heat recovery system with a piping tie-in.

22. The method of claim 21 wherein the substitute stack section further includes means for introducing a reducing agent into a flue gas stream passing therethrough.

* * * * *